D. COZZOLINO.
EVAPORATOR.
APPLICATION FILED SEPT. 20, 1916.
1,250,094.
Patented Dec. 11, 1917.
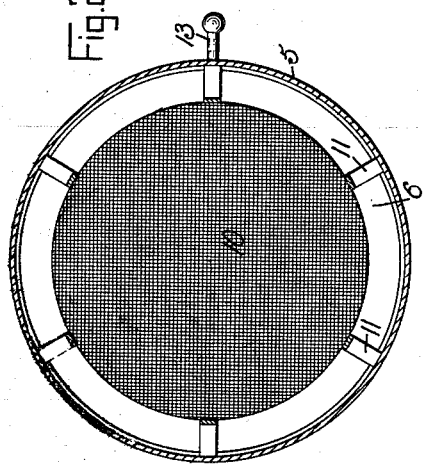
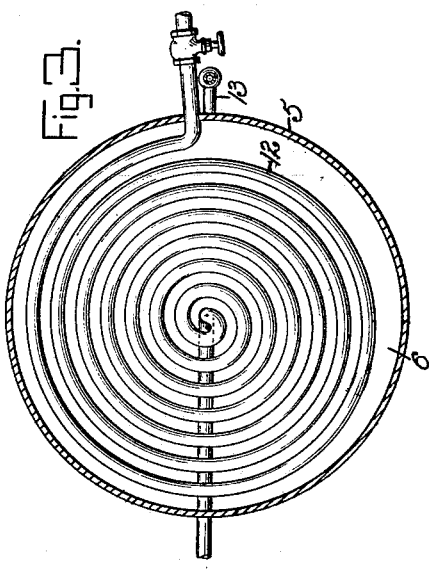
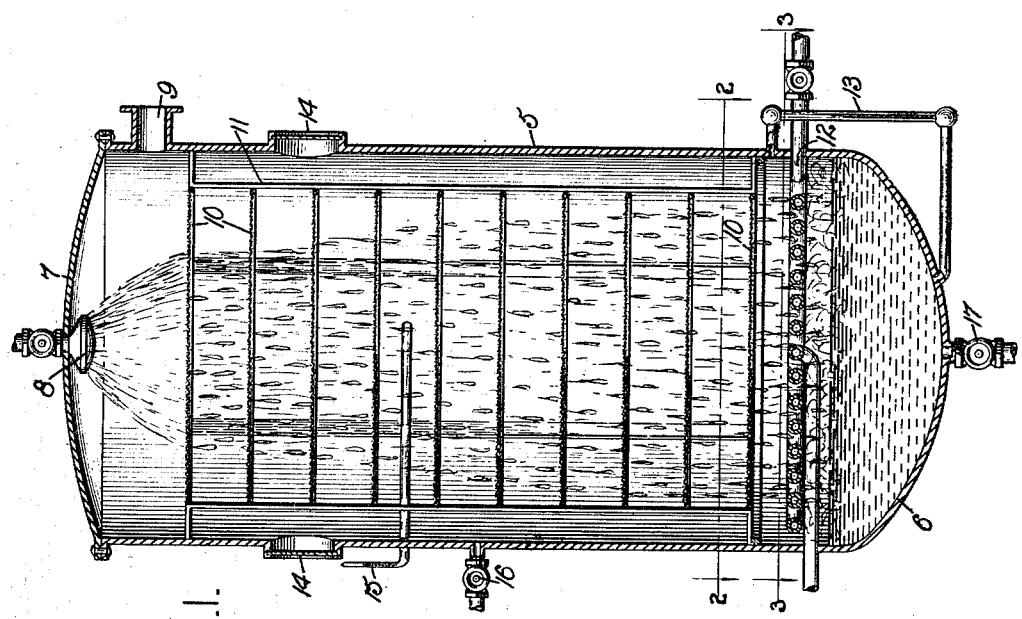
WITNESSES
INVENTOR
D. Cozzolino
BY
ATTORNEYS

UNITED STATES PATENT OFFICE.

DONATO COZZOLINO, OF LOS ANGELES, CALIFORNIA.

EVAPORATOR.

1,250,094.  Specification of Letters Patent.  Patented Dec. 11, 1917.

Application filed September 20, 1916.  Serial No. 121,149.

*To all whom it may concern:*

Be it known that I, DONATO COZZOLINO, a subject of the King of Italy, and a resident of Los Angeles, in the county of Los Angeles and State of California, have invented a new and Improved Evaporator, of which the following is a full, clear, and exact description.

My invention relates to evaporators particularly adaptable for the evaporation of foaming liquids. An object of the invention is to provide a simple, inexpensive and efficient evaporator in which the foam of the liquid is prevented from rising to the vapor outlet.

Another object of the invention is to provide an evaporator in which the foam of the liquid is caused to collapse near the surface of the liquid to be evaporated so as to decrease the resistance to the flow of the liquid vapors.

A further object of the invention is to provide an evaporator which presents a considerable surface to the liquid to be evaporated without presenting much resistance to the flow of vapors formed.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical section through an evaporator embodying my invention;

Fig. 2 is a cross section on line 2—2, Fig. 1; and

Fig. 3 is a similar section on line 3—3, Fig. 1.

It is well known that in foaming liquids evaporation takes place at a lower temperature than that of the foam, and this principle is taken care of in my evaporator by introducing a cooling zone between the vacuum end and the heating end of the evaporator. By this method it is possible to increase the efficiency of the evaporator and also the quality of the product.

Referring to the drawings, 5 is a closed vessel, preferably cylindrical in shape, having a bulging-out bottom 6, which forms the pan where heat may be applied, and a bulging-out top 7. A distributing nozzle 8 is provided at the top 7, preferably in the center thereof to admit liquid therethrough to be evaporated within the vessel. The vessel 5 has a vapor outlet adjacent the top 7, which may be connected to a vacuum pump, for reducing the pressure within the vessel and for drawing off the vapors caused by the reduction of pressure and the application of heat.

To increase the area of evaporation within the vessel 5, a series of superimposing spaced screens 10 are mounted on a suitable frame 11. This frame is carried by the vessel and maintains said screens between the vapor outlet 9 and the liquid surface. The screens 10 are of a smaller diameter than that of the vessel, so that a comparatively undisturbed annular passage remains between the bottom and top of the vessel about the screens 10. These screens are preferably made of fabric, and not only present a large surface of evaporation for the liquid falling upon them but considerably retard the movement of the liquid from the top to the bottom of the vessel, thereby facilitating the evaporation of the same.

Interposed between the liquid surface and the adjacent fabric screen 10 is a cooling zone 12, which is preferably in the shape of a tubular coil disposed in a plane parallel to the liquid surface and through which any suitable cooling medium may be circulated. When alcoholic beverages are evaporated within the vessel, a portion of the alcoholic contents of the evaporator will be lost during the movement of the liquid from the nozzle to the pan by evaporation on the screens. The liquid in the pan being deprived of alcohol has a tendency to foam and prevent evaporation by rising toward the vapor outlet 9. By circulating a cooling medium through the coil 12 the foam is caused to collapse, the foam being the result of the temperature of the liquid in the pan and the vacuum in the vessel. Some of the vapors will condense, but the lighter vapors will be free to rise to the vapor outlet 9. At all events, the temperature of the cooling medium is not such as to condense the vapors, but only sufficient to cause the collapsing of the foam.

The vessel 5 is provided with a gage 13 for indicating the level of the liquid in the pan. Heat may be supplied to the pans in any well known manner. The application of the heat is such that the liquid never boils, but simmers. Peep holes 14 are provided in the vessel 5 for viewing the process of evaporation within the vessel. A thermometer 15 is also provided for indicating the temperature within the vessel 5, and a valve controlled air vent 16 is provided substantially in the middle of the vessel. The pan 6 has also a valve-controlled outlet 17.

While I have described the principle of operation, together with the device which I now consider to be the best embodiment thereof, I desire to have it understood that the device shown is merely illustrative and that such changes may be made as are within the scope of the appended claims.

I claim:

1. An evaporator comprising a closed vessel having a bulging bottom to form a pan for liquid, said vessel having a vapor outlet near the top whereby it may be subjected to vacuum, a plurality of superimposed spaced screens of a diameter smaller than the vessel and disposed coaxially with the vessel between the vapor outlet and the pan whereby an unobstructed vertical passage is formed between the vapor outlet and the pan about the screens, and means for supplying liquid in spray form to the top of the vessel, whereby said liquid is caused to travel through the screens to reach the pan.

2. An evaporator comprising a closed vessel having a pan at the bottom and a vapor outlet near the top whereby the vessel may be subjected to vacuum, a plurality of superimposed spaced screens of a diameter smaller than that of the vessel supported within the vessel so as to provide a substantially free annular passage from the pan to the vapor outlet about said screens, and means for supplying liquid on to the uppermost screen.

3. An evaporator comprising a closed vessel having a bulging bottom constituting a pan for liquid, means for supplying liquid to the pan, means in the vessel for breaking up the liquid into fine particles, said vessel having a vapor outlet near the top whereby the vessel may be subjected to vacuum, and a flat, tubular coil disposed within the evaporator above and in close proximity to the bottom-forming pan and below the means for breaking up the liquid, said coil adapted to carry a cooling medium for causing the collapsing of foam rising from a liquid in the pan under the vacuum in the vessel before it reaches the top of the means for breaking up the liquid.

DONATO COZZOLINO.

Witnesses:
EDWIN W. VAN FLEET,
ALFRED P. WALBRIDGE.